United States Patent [19]

Davis

[11] 4,062,711
[45] Dec. 13, 1977

[54] METHOD FOR FORMING FIBERGLASS-RESIN LAMINATE WITH PERMANENT INDICIA PATTERN

[76] Inventor: R. Elbert Davis, 1401 Valley View Road, No. 425, Glendale, Calif. 91202

[21] Appl. No.: 637,259

[22] Filed: Dec. 3, 1975

[51] Int. Cl.² ............................................. B29C 19/00
[52] U.S. Cl. .................................. 156/244; 156/247; 156/285; 428/172; 428/203; 428/210; 428/211; 428/285; 428/295
[58] Field of Search ............... 156/277, 269, 583, 240, 156/303.1, 247, 244, 285; 428/67, 914, 187, 114, 203, 210, 211, 285, 295, 172

[56] References Cited

U.S. PATENT DOCUMENTS

| | | | |
|---|---|---|---|
| 2,571,962 | 10/1951 | Smith et al. | 156/277 X |
| 2,700,629 | 1/1955 | Townsend | 428/914 X |
| 3,137,601 | 6/1964 | Menzer | 428/195 X |
| 3,434,861 | 3/1969 | Luc | 156/247 X |
| 3,660,196 | 5/1972 | Keeling et al. | 156/247 X |
| 3,834,964 | 9/1974 | Blasing, Jr. | 156/269 |
| 3,928,710 | 12/1975 | Arnold et al. | 428/914 X |

*Primary Examiner*—Marion E. McCamish
*Attorney, Agent, or Firm*—Nilsson, Robbins, Dalgarn, Berliner, Carson & Wurst

[57] ABSTRACT

A fiberglass-resin laminate is produced with a permanent pattern of indicia thereon. Fiberglass mat and/or roving is passed in a multilayer, continuous, elongate form through a reservoir of resin for combination therewith. The combination is drawn together with an aligned and adjacent continuous and elongate support sheet, bearing the desired pattern of indicia, through a die for compressing the components together to form a self-supporting, elongate, laminated structure having the indicia permanently visible thereon, either submerged below an external surface of the laminate or, upon stripping of the indicia, as an intaglio pattern.

2 Claims, 11 Drawing Figures

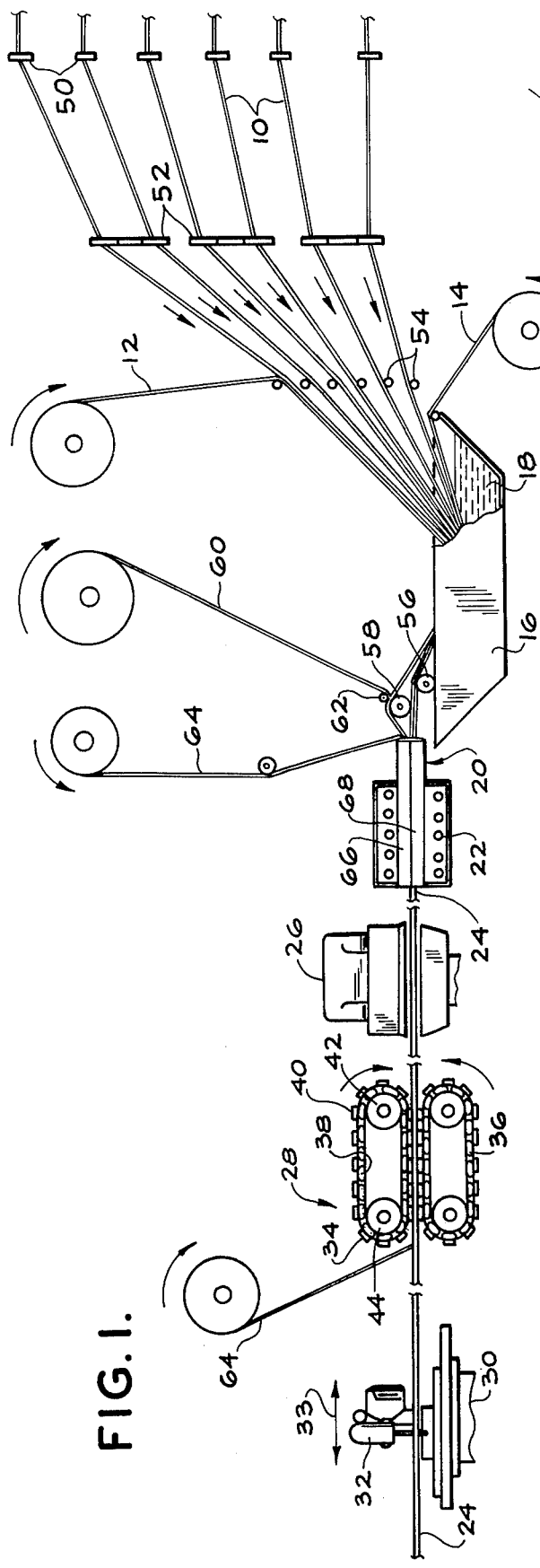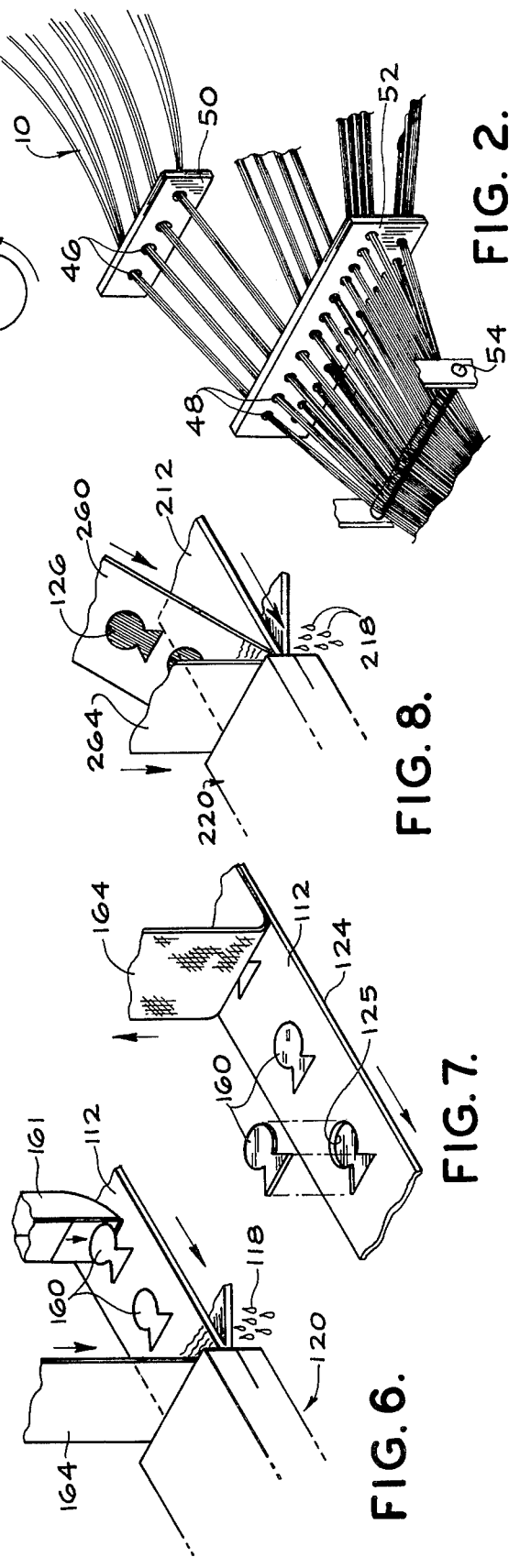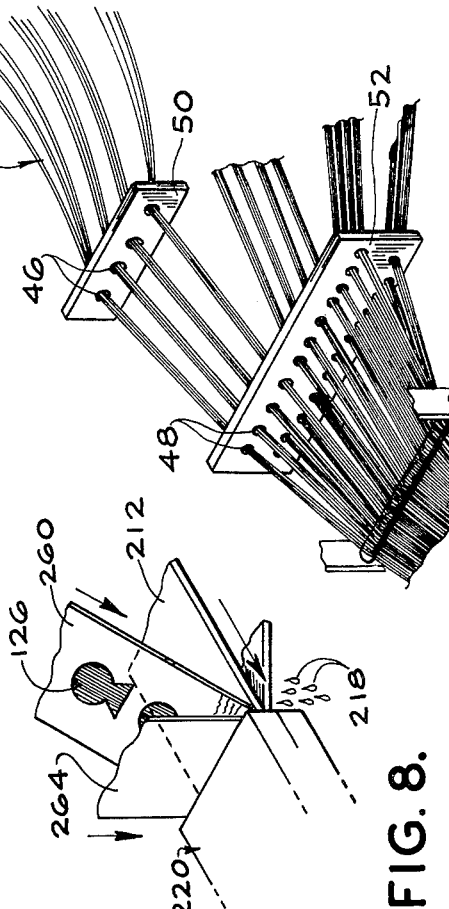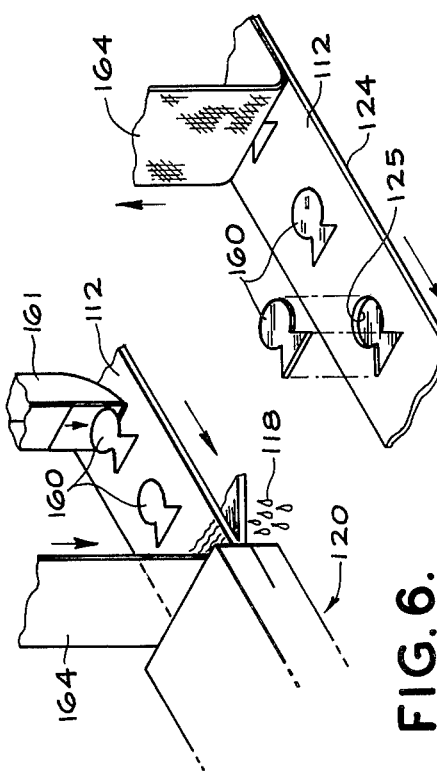
FIG. 1. FIG. 2. FIG. 6. FIG. 7. FIG. 8.

METHOD FOR FORMING FIBERGLASS-RESIN LAMINATE WITH PERMANENT INDICIA PATTERN

FIELD OF THE INVENTION

The present invention relates to reinforced plastic laminated structures, particularly fiberglass reinforced thermosetting resins and the like in elongate form, more particularly as obtained by drawing the components through a forming die.

BACKGROUND AND SUMMARY OF THE INVENTION

Fiberglass devices are manufactured utilizing a number of techniques. For example, in one technique a structure is built up by spraying chipped fiberglass roving and resin together onto a mold having the desired configuration. In another, more recent, process fiberglass roving and/or mats are continuously drawn through a resin bath and the combination of fiberglass and resin is compressed and heated in a forming die. A continuous process is thus provided for the production of a laminated fiberglass-resin structure. The process, which can be called pultrusion (in distinction from extrusion), is particularly well adapted for the production of continuous lengths of board which are substantially longer than wide and substantially wider than thick. Such boards have a number of utilities, a popular utility being for the formation of skateboards and of surfboards, each of which require a high degree of rigidity yet also require a thin, elongate form. Such boards are also made by compression molding, and, in fact, until the present invention, the latter process provided a number of advantages over continuous processes in its ability to enable indicia to be imprinted directly into the outer surface of the laminated structure.

I have now discovered a method for operating a continuous pultrusion process so that it provides additional advantages not heretofore obtainable with such process. Specifically, I have now discovered a method by which a fiberglass-resin laminate can be continuously formed with a permanent pattern of indicia thereon. In one embodiment, the indicia is in the form of printing or the like submerged beneath an external surface of the laminate and visible through the resin. In another embodiment, the process enables a pattern of indicia to be imprinted in intaglio form into the outer surface of a laminated structure.

More specifically, a multilayer of fiberglass, formed of elongate rows of roving and/or fiberglass mat, is continuously passed through a reservoir of resin therefor to thereby obtain combination of the resin with the fiberglass. A support member having a continuous elongate sheet form, and bearing the pattern of indicia, is disposed in alignment with and adjacent the outermost layer of the fiberglass. The combination of fiberglass and resin and the aligned support member are drawn together through a die having internal opposing surfaces which are spaced sufficiently close one to the other to substantially compress together the support member, fiberglass and resin, and the die is heated sufficiently to at least partially cure the resin whereby, upon cooling, a self-supporting, unitary, elongate laminated structure is obtained having a permanent pattern of the indicia visible thereon below the plane of an external surface of the laminate.

The process includes a number of embodiments in which the indicia is provided as a pattern submerged beneath an external surface of the laminate. In this regard, the support member can comprise a sheet, such as a sheet of cloth, carrying the indicia as a printed pattern thereon. In another embodiment, the indicia is carried on a potentially transparent support member, such as paper, which when subjected to the heat of the die impregnates and disappears leaving the indicia visible.

In a further embodiment, the support member is in the form of a transparent polymer material and in this regard the indicia can be printed in reverse on the bottom surface of such material or can be printed on a second layer or coating of organic polymer material aligned therewith and disposed therebeneath. In the latter embodiment, the second layer can be formed of such material as polyvinylidene chloride while the first polymer sheet is formed of a material, such as a terephthalate polyester, having poor adhesion therefor. After the laminate has been drawn through the forming die and cooled somewhat, upon removal of the terephthalate polyester, a smooth glossy surface is provided, enhancing the appearance of the product.

In still another embodiment, a top layer of fiberglass mat constitutes the support member and is directly imprinted with the desired indicia, or a discontinuous series of flat members are disposed thereon, each member being sufficiently thick so as to leave, when removed, an intaglio pattern.

Other aspects of the present invention will be understandable as the invention is described in more detail hereinafter. A result of the process is the creation, as a unique product, of a self-supporting, elongate, structure comprising a unitary laminate of a plurality of layers of fiberglass and resin and formed with a permanent pattern of visible indicia submerged beneath an external surface thereof.

BRIEF DESCRIPTION OF THE DRAWINGS

FIG. 1 schematically depicts apparatus for forming a fiberglass-resin laminate carrying indicia, in accordance with an embodiment of the present invention;

FIG. 2 is a perspective view of a portion of the apparatus of FIG. 1 depicting the alignment and arraying of glass fiber rovings;

FIG. 6 is a perspective view of components used to provide an intaglio pattern in accordance with an alternative embodiment of the invention;

FIG. 7 depicts a step in the formation of the intaglio pattern obtained as a result of operation of the components of FIG. 6; and FIGS. 8–11 are perspective views of components used in forming submerged patterns of indicia in accordance with additional alternative embodiments of the invention.

DETAILED DESCRIPTION

Figure 3:
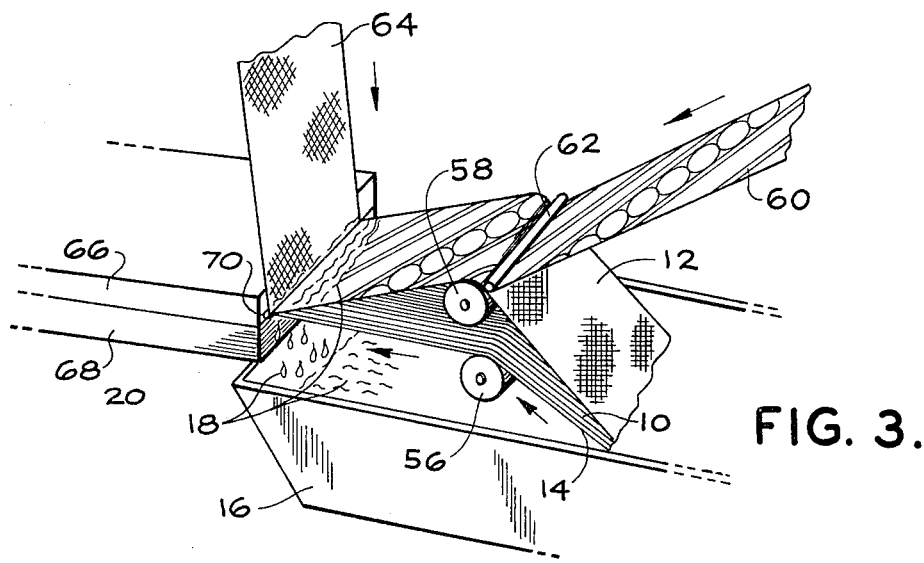
FIG. 3 is a detail of the apparatus of FIG. 1 depicting the disposition of a multilayer of fiberglass, resin and indicia-bearing sheet at the point of entry to a heated former die.

As required, detailed illustrative embodiments of the invention are disclosed herein. However, it is to be understood that these embodiments merely exemplify the invention which may take forms that are different from the specific illustrative embodiments disclosed. Therefore, specific structural and functional details are not to be interpreted as necessarily limiting, but as a basis for the claims which define the scope of the invention.

Referring to FIG. 1, the process of the present invention is continuous and operates by pulling or drawing continuous lengths of glass fiber rovings 10, sandwiched between top and bottom continuous lengths of glass fiber mats or sheets 12 and 14, respectively, through a reservoir 16 of resin 18, through a forming die 20 heated, as indicated at 22, to at least partially cure the resin, whereupon a self-supporting, unitary, elongate laminated structure 24 is obtained. The laminate structure 24 is continuously pulled past a cooling blower 26 and through the pulling mechanism 28 from where it travels to a cutting station 30 where a saw 32 (also moving as shown by the arrow 33) is operative to cut away segments of the now completely rigid laminated structure 24.

The pulling mechanism 28 includes a top member 34 and bottom member 36 disposed on opposite sides of the laminated structure 24 and each formed of opposed continuous edge loops of tracks 38 carrying shoes or gripper pads 40 which engage the opposite surfaces of the laminated structure 24. The tracks 38 are driven by a drive wheel 42 around an idler roller 44. Initially, to start the process, and before resin 18 is placed in the reservoir 16, the glass fiber rovings 10 and mats 12 and 14 are fed together by hand through the die 20, blower 26 and pulling mechanism 28. Thereafter, the resin 18 is placed in the reservoir 16 and actuation of the pulling mechanism 28 results in continuous movement of the components through the system to provide the laminated structure 24.

Referring additionally to FIG. 2, the glass fiber rovings 10 are fed from supply reels (not shown) through openings 46 and 48 in distal and proximal feed guides 50 and 52, respectively, and from there onto rollers 54 which direct the rovings toward the reservoir 16. In the particular laminated structure formed with the depicted apparatus, glass fiber rovings are used which provide 113 yards of rovings per pound and specifically 185 rovings 10 are used, each roving containing hundreds of individual glass fiber strands. The glass fiber mats 12 and 14 are formed of glass fiber strands which are cross woven and provide a substantial amount of strength to the unit. The array of glass fiber rovings 10 and sandwiching glass fiber mats 12 and 14 are guided so as to be disposed in alignment upon entering the reservoir 16.

Referring additionally to FIG. 3, the aligned assembly of rovings 10 and mats 12 and 14 emerge from the resin 18 and are separated into an upper portion and a lower portion. The upper portion can consist only of the top mat 12, as illustrated, or may include some of the rovings 10. The bottom portion in the exemplification includes the rovings 10 and the bottom glass fiber mat 14. The bottom portion is led over a lower roller 56 while the upper portion is led over an upper roller 58 and from there the portions join in alignment and enter the forming die 20.

In accordance with one embodiment of the present invention an indicia support member is provided, in this case in the form of an elongate sheet of cloth 60 with the desired indicia printed thereon. The cloth sheet 60 is disposed in alignment with and adjacent the top glass fiber mat 12 by means of a horizontally disposed elongate rod 62 biasing the sheet 60 and mat 12 against the top roller 58. Accordingly, the indicia bearing sheet 60 is pulled with the remaining components of the laminated structure into the forming die 20. At that point, one can also dispose in alignment an elongate cover sheet 64 which is positioned to cover the assembly of rovings 10, mats 12 and 14 and indicia sheet 60, prior to entry into the forming die 20. The cover sheet 64 is constituted by woven cloth or the like material having a textured bottom surface. As illustrated in FIG. 1, the cover sheet 64 is removed following travel of the assembly through the pulling mechanism 28 and serves to leave behind an imprint in the surface of the laminated structure, thereby providing a matte finish. The cover sheet 64 can be omitted, in which case the top surface of the laminated structure 24 would have a smooth finish as a result of contact with the inner surface of the forming die 20.

The forming die 20 includes a top plate 66 and a bottom plate 68 with generally smooth inner surfaces formed with a reduced thickness portion so that when they are clamped together, a channel 70 is formed through which the assembly of rovings 10, mats 12 and 14, indicia sheet 60 and cover sheet 64, all combined, permeated and pervaded with resin 18 carried from the reservoir 60, is squeezed, resulting in a compression of the components. The forming die is heated to around 300° F and the aforementioned assembly is pulled therethrough at the rate of about two feet per minute so that as the assembly emerges, it has at least partially cured or rigidified and as it passes through the cooling blower assembly 26, it emerges as a self-supporting, elongate, unitary laminated structure. The pattern of indicia carried on the indicia sheet 60 is thereby defined as a permanent pattern of visible indicia submerged beneath the top external surface of the laminated structure 24.

Figure 4:
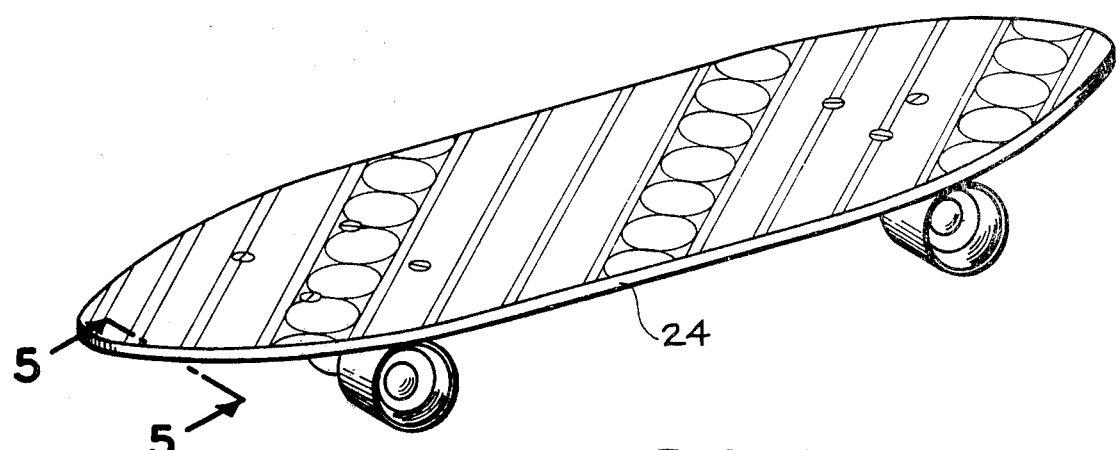
FIG. 4 is a perspective view of a skateboard in which the board is formed utilizing the apparatus depicted in FIGS. 1–3.
Figure 5:
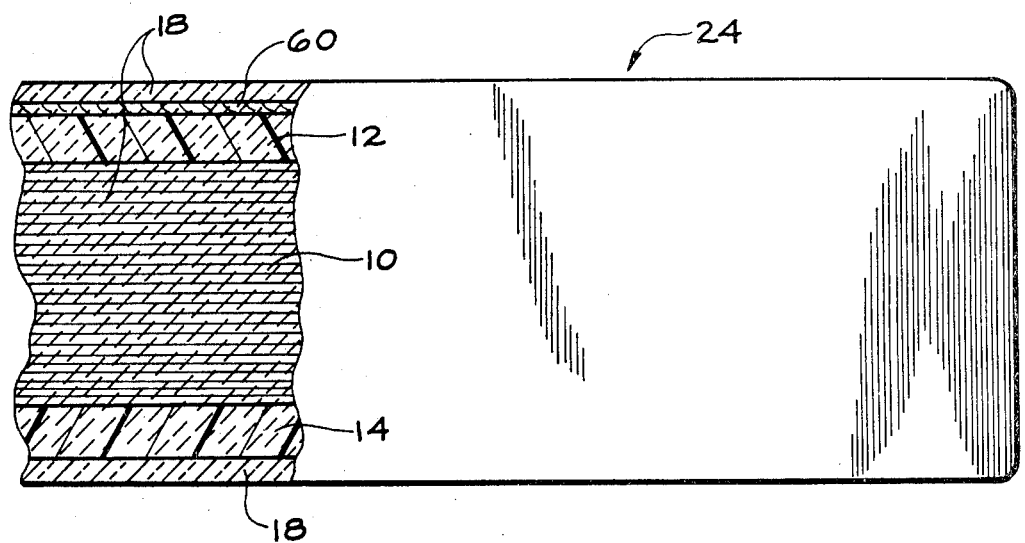
FIG. 5 is a cross-sectional view of the board of FIG. 4, taken on line 5—5 of FIG. 4.

Referring now to FIGS. 4 and 5, in FIG. 4 there is illustrated a particular utility to which one can put the laminated structure 24. The structure is in the form of an elongate board as it emerges from the pulling mechanism and is cut to sizes appropriate to the formation of skateboards. The laminated structure is further cut and its edges smoothed as shown, and it is one of the characteristics of the permanent indicia feature that such cutting and edge smoothing can take place without warping or otherwise destroying or marring the pattern of indicia.

Referring more closely to the structure in FIG. 5, one can see that there is provided a board structure having a central core of glass fiber rovings 10 sandwiched between mat sheets 12 and 14 and in which the indicia sheet 60 is formed of a layer above the top mat 12. The components are all impregnated with and encased by the cured resin, as indicated by the solid and shadow shading at 18. It will be appreciated that the structure depicted in FIG. 5 is not simply a combination of layers which are separately formed and then subsequently joined by heat or otherwise, but is an integral unitary structure in which the resin 18 permeates and pervades the entire structure so that the indicia is part and parcel of the laminated structure itself.

With respect to the resin, in a specific exemplification, a polyester resin is used, but other thermosetting resins such as epoxy resins could also be used. In broader terms for various uses, and for specialized uses, one can utilize as the resin any organic polymer-forming material, including monomers which form polymers.

Examples include phenolformaldehyde resins; polyamide resins, such as nylon and polymers obtained from dimerized fatty acids, polyester resins, unsaturated polyesters, polyethylene terephthalate, aromatic polycarbonates and polydiallyl esters; polyether resins, such as epoxy resins, polyethylene oxide, polypropylene oxide, phenoxy resins, polyphenylene oxide resins, polyoxymethylene and chlorinated polyethers, polysulfide resins; polysulfone resins; polyurethane resins; silicone resins, such polydimethylsiloxane amino resins, such as urea-formaldehyde resin, melamine-formaldehyde resin; heterocyclic polymers, such as polyamide resins; polybenzimidazoles and polybenzothiazoles; polyacrylate resins, such as polymethyl methacrylate, polyethyl acrylate, methyl chloroacrylate, cyclohexyl methacrylate and polymethyl-2-cyano-acrylate; polyacrylonitrile resins; acrylinitrile-butadiene resins; polyfluorolefin resins such as polytetrafluoroethylene, polymonochlorotrifluoroethylene, polyvinylidene fluoride and fluorinated elastomers, polyolefin resins, such as polyethylene, polypropylene, polyisobutylene, polypentene-1, poly-4-methylpentene-1, poly-butadiene, poly-3-methylbutene-1, polyisoprene and poly-2-chlorobutadiene; polystyrene resins; and polyvinyl resins, such as polyvinyl chloride, polyvinyl acetate, polyvinylidenechloride, polyvinyl alcohol, polyvinyl acetals, polyvinyl ethers, polyvinyl fluoride, polyvinyl pyrrolidone, polyvinyl carbazole and polyvinyl cinnamate.

Generally, the polymer former is used in its liquid state, when it is somewhat polymerized but not fully cross-linked. Furthermore, precursor ingredients to full polymer formation are fully utilized, such as the usual diluents, catalysts, extenders, and the like as would normally be used.

The present invention finds particular usefulness with the thermosetting resins and specific exemplification is made with polyester resins. Such resins are formed by catalyzed reaction of an unsaturated dibasic acid or anhydride and a dihydric alcohol in a reaction monomer such as styrene which, as a result of its olefinic nature, takes part in the reaction. The specific form of precursor resin exemplifed herein is a polyester resin obtained from the reaction of maleic anhydride and diethylene glycol in styrene, catalyzed by Bis(4)tert butyl cyclohexyl peroxydicarbonate.

The process and structure depicted in FIGS. 1-5 represent a particular form of the invention but other forms can be used as illustrated in FIGS. 6-11. In these figures, the process conducted is identical to that performed by the components illustrated in FIG. 1 except where specific alternative components are shown. Referring to FIGS. 6 and 7, in one alternative embodiment, the top glass fiber mat 112 is itself used as an indicia support sheet. In this particular case, the indicia is in the form of a tandemly disposed discontinuous series of flat members 160, placed on the outer surface of the top glass fiber mat 112 by means of a dispensing chute 161 which communicates with a source (not shown) of the flat members 160. Any convenient mechanism can be utilized to feed the flat members 160 to and through the chute 161. As the top mat 112 bearing the flat members 160 approaches the forming die 120, it is covered by a cover sheet 164 so that the assembly of bottom mat, rovings, top mat 112, flat members 160, cover sheet 164 and permeating resin 118 is squeezed together through the forming die 120.

Referring specifically to FIG. 7, after the aforesaid assembly passes through the forming die 120, cooling blower and pulling mechanism, it emerges as a laminated structure 124. At that point, the cover sheet 164 is removed and one one then lifts out the flat members 160, as illustrated. Any mechanism can be used for lifting the flat members, or one can simply lift the members with one's fingers or by using pinchers and the like to grab the members, deforming them and drawing them from the surface of the laminated structure 124. The result is an intaglio pattern formed as a depression below the plane of the top surface of the laminate, as indicated at 125.

Accordingly, by following either the procedure of FIGS. 1-3 or of FIGS. 6 and 7, one can obtain a self-supporting, unitary, elongate, laminated structure having a permanent pattern of the desired indicia visible thereon below the plane of an external surface of the laminate. In the case of the process of FIG. 1-3, the pattern is not only below the plane of the top surface of the laminate, but is in fact submerged below that surface whereas in the process practiced in accordance with FIGS. 6 and 7, the pattern is in the form of an intaglio impression through the outer surface of the laminated structure.

In practice of the invention depicted in FIGS. 6 and 7, the flat member 160 should have a thickness in excess of 100 mils so as to avoid encapsulation with the laminate. However, in still another embodiment of the invention, one uses a flat member 160 having a thickness less than 100 mils, in the range of 0.25-100 mils, at any rate at a thickness which is sufficiently thin so that the flat member 160 is in fact encapsulated and submerged beneath the external surface of the laminated structure 124. In this regard, the flat members 160 can be in the shape of the desired indicia, as shown, or can be printed matter on a plastic sheet, such as would be found with decals or the like, in which case the sheets would constitute the discontinuous plurality of tandemly disposed flat members.

Referring now to FIG. 8, still another embodiment is shown in which the cloth member 60 of FIG. 1 is substituted by a support member 260 formed of paper or the like and which is destructable at the temperature to which material is subjected while passing through the forming die 220. The indicia, indicated at 261, is carried on the support member 260 in the form of an ink pattern. The support member 260 with its printed indicia 261 is disposed in alignment with the top glass fiber mat 212 in the manner depicted in FIG. 1, and disposed with permeating resin 218 and a cover sheet 264 through the forming die 220. The support member 260 is transparentized as a result of impregnation by the permeating resin 218 in the forming die 220, but the indicia, which is constituted by inorganic ink particles, is not destroyed and, following emergence of the product from the forming die 220, appears visible, submerged below the surface of the laminated structure.

The cover sheet 264 is an organic polymer material having a smooth, continuous bottom surface, disposed in alignment with and adjacent the top surface of the support member 260. Upon removing the cover sheet 264, following emergence of the laminated structure from the pulling mechanism, a smooth surface is obtained having a glossiness which, in the absence of the smooth cover sheet 264, would require lacquering step.

If it is desired to obtain such a glossy surface with the process of FIG. 1, one can use the cover sheet 264 of FIG. 8 in place of the cloth cover sheet 64 of FIG. 1.

Figure 9:
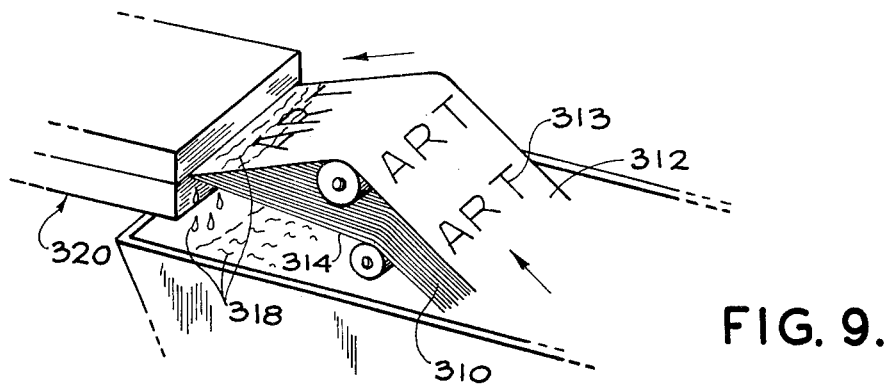

Referring now to FIG. 9, in a still further embodiment, the desired indicia is printed directly onto the top fiberglass mat 312, as indicated at 313. Of course, the mat 312 is printed prior to forming of the mat into a supply roll. The assembly of indicia bearing top mat 312, lower mat 314 and rovings 310, together with resin 318, is squeezed through the forming die 320 as previously described. In the particular embodiment illustrated in FIG. 9, no cover sheet is used, and, accordingly, the resultant laminated structure product will have a smooth top surface. As with the previous embodiments, one can obtain a matte finish by using a woven cover sheet, or a glossy, lacquer-like finish by using a cover sheet of organic polymer material.

In describing the embodiments of FIGS. 1-9, the several support members 60, 112, 260 and 312 were defined by various materials. The support member 60 of FIG. 1 has been described as a cloth sheet whereas the support member 112 of FIG. 6 is the top glass fiber mat itself, as is the support member 312 of FIG. 9. The support member 260 of FIG. 8 is a sheet of paper or the like. Accordingly, the support member can be inorganic as with respect to the glass fiber mats 112 and 312 or can be organic as is the cloth sheet 60 and paper sheet 260. In this regard, as an organic support member, one could also use an organic polymer support member and such is illustrated in FIGS. 10 and 11.

Figure 10:
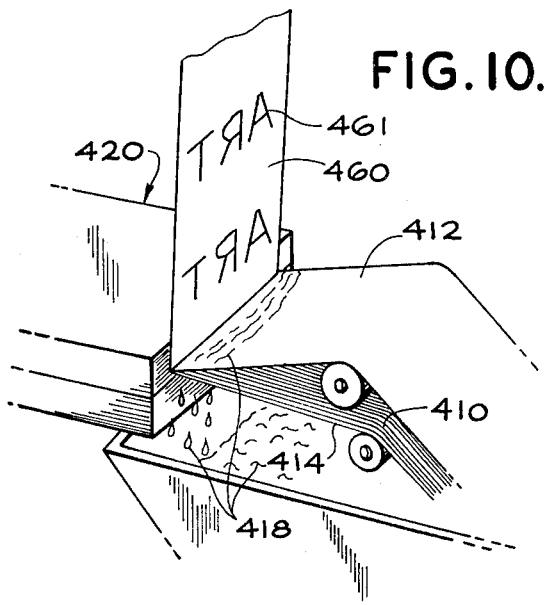

Referring to FIG. 10, an embodiment is illustrated wherein there is an indicia support sheet 460 formed of organic polymer material having a smooth, continuous bottom surface and which is disposed in alignment with and adjacent the top surface of the top glass fiber mat 412. In particular, the indicia support member 460 is a substantially transparent polymer material. Indicia, indicated at 461, is printed, in reverse of the desired pattern, on the bottom surface of the support member 460. In the embodiment illustrated in FIG. 10, no cover sheet is provided. The assembly of printed transparent organic bottom support member 460, top and bottom glass fiber mats 412 and 414, respectively, and roving 410 is squeezed together, with resin 418, through a forming die 422 to produce the product as hereinbefore described.

Figure 11:
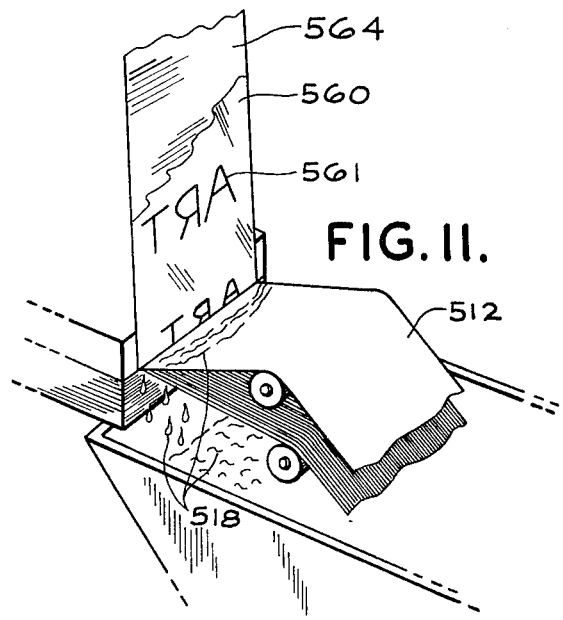

Referring now to FIG. 11, an embodiment is illustrated which is particularly useful to provide an attractive product. The embodiment is similar to that of FIG. 10 in that an indicia-supporting support sheet 560 is provided formed of transparent organic polymer material and on which indicia as indicated at 561 is printed in reverse thereon. However, in addition to the organic polymer support member 560 there is also provided a cover sheet 564 which is preferably formed also of an organic polymer material. In particular, the cover sheet 564 is formed of a material having poor adhesion for the support member 560. In a particularly useful combination, the cover sheet 564 is relatively thick while the support member 560 is relatively thin so that the indicia 561 can be printed on the support member 560 while it is in contact with and supported by the cover sheet 564. After such printing operation, the two sheets can be rolled together to provide a supply thereof and used as desired in the present process.

Following emergence from the cooling mechanism, the cover sheet 564 is stripped from the laminated structure, leaving behind, embedded in the surface of the laminated structure, the support member 560 with its indicia 561 visible in right reading fashion.

As indicated, it is preferable that the support member 560 be thinner than the cover sheet 564 and it can be about 0.25-1.0 mil whereas the cover sheet 564 can conveniently be greater than 0.5 mil, up to 100 mils.

As the support member 560 one can use any organic polymer material which forms a thin, flexible film such as polyethylene, polypropylene, or the like, or more preferably polyvinylidene chloride. The cover sheet 564 is, as above indicated, formed of material which has poor adhesion for the support member and can be formed of a terephthalate polyester, such as polyethylene terephthalate polyester film sold under the trademark "Mylar," a polyfluoro hydrocarbon such as sold under the trademark "Teflon," a polyamide, such as sold under the trademark "Kapton," or the like. It will also be appreciated that such material as described for the cover sheet 564 in FIG. 11 can also be used as the cover sheet 264 in FIG. 8, can replace the cover sheet 60 in FIG. 1 and 164 in FIG. 6, and can be added as the cover sheet to the processes depicted in FIGS. 9 and 10.

I claim:

1. A continuous process for the formation of a fiberglass-resin laminated structure with a permanent pattern of indicia thereon, comprising:

passing fiberglass in a multi-layer, continuous, elongate form through a reservoir of resin therefor to thereby obtain combination of said resin with said fiberglass;

disposing a sheet of cloth having a continuous, elongate form, and having said pattern of indicia printed on its top surface, in alignment with and adjacent the outermost layer of said fiberglass; and drawing said resin and fiberglass combination and said aligned sheet of cloth together through a die having internal opposing surfaces spaced sufficiently close one to the other to substantially compress together said sheet of cloth, fiberglass and resin, and heating in said die sufficiently to at least partially rigidify said resin whereby, upon cooling, a self-supporting, unitary, elongate laminated structure is obtained having a permanent pattern of said indicia visible thereon submerged below the plane of an external surface of said laminate.

2. The process of claim 1 including the step of disposing an elongate cover sheet, having a textured bottom surface, in alignment with and adjacent the top surface of said sheet of cloth prior to said drawing step, and removing said cover sheet after said drawing step whereby to leave an imprint in the top surface of said laminated structure.

* * * * *